United States Patent [19]

Kondo et al.

[11] Patent Number: 4,527,709
[45] Date of Patent: Jul. 9, 1985

[54] RESERVOIR ASSEMBLY

[75] Inventors: Hiroyuki Kondo; Yoshikane Yoshimura, both of Kariya; Yoshihisa Nomura, Toyota, all of Japan

[73] Assignees: Aisin Seiki Kabushiki Kaisha, Kariya; Toyota Jidosha Kabushiki Kaisha, Toyota, both of Japan

[21] Appl. No.: 622,880

[22] Filed: Jun. 21, 1984

[30] Foreign Application Priority Data

Jun. 23, 1983 [JP] Japan ............................... 58-96755[U]

[51] Int. Cl.³ ............................ F51B 7/10; B65D 1/24
[52] U.S. Cl. ..................................... 220/22; 220/20.5; 60/592
[58] Field of Search .................... 220/22, 20.5, 4 B; 137/265, 574, 576, 592; 60/535, 562, 595, 592; 188/345

[56] References Cited

U.S. PATENT DOCUMENTS

| 3,521,745 | 7/1970 | Schwartzman | 220/20.5 X |
|---|---|---|---|
| 4,181,147 | 1/1980 | Fujii et al. | 60/592 X |
| 4,185,750 | 1/1980 | Op den Camp | 220/20.5 |
| 4,198,824 | 4/1980 | Nogami et al. | 60/592 X |
| 4,200,205 | 4/1980 | Ban et al. | 220/20.5 |
| 4,424,829 | 1/1984 | Millington et al. | 220/22 X |
| 4,431,027 | 2/1984 | Sabina, Jr. | 220/22 X |
| 4,472,943 | 9/1984 | Grabill | 60/592 X |

FOREIGN PATENT DOCUMENTS 5785353  11/1980  Japan .

Primary Examiner—Steven M. Pollard
Attorney, Agent, or Firm—Oblon, Fisher, Spivak, McClelland & Maier

[57] ABSTRACT

A reservoir assembly comprises a pair of cup-shaped housing members each made of thermoplastic resin and having an opening end, the housing members being integrally secured by heat welding to each other at their opening ends, and a partition plate arranged within the housing members to subdivide the interior of the reservoir assembly into two chambers. In the reservoir assembly, one of the housing members is formed at the opening end portion thereof with a stepped inner wall which is coupled with the outer periphery of the partition plate in such a manner that the partition plate is positioned inside the opening end of the housing member and fastened in place by an annular bead which is radially inwardly extruded at the opening end of the housing member during the heat welding process.

5 Claims, 7 Drawing Figures

RESERVOIR ASSEMBLY

BACKGROUND OF THE INVENTION

The present invention relates to reservoir assemblies, and more particularly to a reservoir assembly the housing of which comprises a pair of cup-shaped housing members of thermoplastic resin integrally secured to each other by heat welding at their opening ends and in which a partition plate is fixedly arranged in place within the interior of the housing to form first and second chambers respectively for connection to, for instance, a vacuum pump and a pneumatically operated device.

In such a conventional reservoir assembly as described above, the partition plate is arranged to interrupt the flow of hydraulic fluid from one of the chambers into the other chamber. In FIGS. 1 and 2 there is illustrated a partition plate 1 secured in a conventional manner to an inner wall of a reservoir housing 2. The partition plate 1 of FIG. 1 is secured at A to the inner wall of housing 2 by means of heat calking or ultrasonic welding. In such an arrangement, it is required to provide the inner wall portion A in a configuration suitable for a heat calking or ultrasonic welding machine, and it is further required to weld the partition plate in place after prearrangement within the reservoir housing 2. Meanwhile, the partition plate 1 of FIG. 2 is provided at its outer periphery with an annular recess 1a which is engaged with an annular projection 2a formed at the inner wall of reservoir housing 2 to resiliently secure the partition plate 1 in place. In such an arrangement, a molding die for the reservoir housing 2 is complicated in its constrution due to provision of the annular projection (or an annular recess) at the inner wall of housing 2. In the case that the partition plate is made of synthetic resin, a molding die for the partition plate is complicated in its construction due to provision of the annular recess (or an annular projection) at the outer periphery of the partition plate, and the partition plate 1 must be fastened in place with a strong press fit.

SUMMARY OF THE INVENTION

It is, therefore, a primary object of the present invention to provide a reservoir assembly the housing of which can be formed by a simple molding die at a low cost and in which a partition plate is secured in place within the reservoir housing in a simple manner.

According to the present invention, there is provided a reservoir assembly which comprises a pair of cup-shaped housing members each made of thermoplastic resin and having an opening end, the housing members being integrally secured by heat welding to each other at their opening ends, and a partition plate arranged within the housing members to subdivide the interior of the reservoir assembly into first and second chambers, and wherein one of the housing members is formed at the opening end portion thereof with a stepped inner wall which is coupled with the outer periphery of the partition plate in such a manner that the partition plate is positioned inside the opening end of the housing member and fastened in place by an annular bead which is radially inwardly extruded at the opening end of the housing member during the heat welding process of the housing members.

In a preferred embodiment of the present invention, there is provided a reservoir assembly adapted to be interposed between a vacuum pump and a pneumatically operated device, which reservoir assembly comprises a pair of cup-shaped housing members each made of thermoplastic resin and having an opening end, the housing members being integrally secured by heat welding to each other at their opening ends, and a pair of partition plates arranged within the housing members to subdivide the interior of the reservoir assembly into three chambers, and wherein the housing members are formed respectively at their opening ends with a stepped inner wall which is coupled with the outer periphery of the respective partition plates in such a manner that each of the partition plates is positioned inside the opening end of the respective housing members and fastened in place by an annular bead which is radially inwardly extruded at the opening end of the respective housing members during the heat welding process.

BRIEF DESCRIPTION OF THE DRAWINGS

Additional objects and advantages of the present invention will be readily apparent from the following detailed description of the preferred embodiment thereof when taken together with the accompanying drawings, in which.

DETAILED DESCRIPTION OF THE PREFERRED EMBODIMENT

Figure 1:
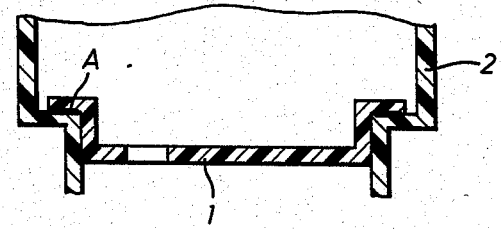
FIGS. 1 and 2 illustrate an arrangement of a partition plate in conventional reservoir assemblies.
Figure 2:
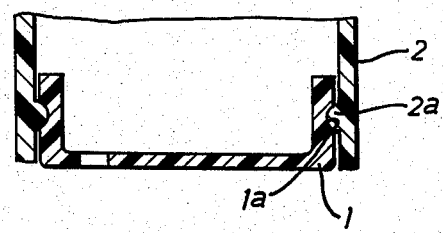
Figure 3:
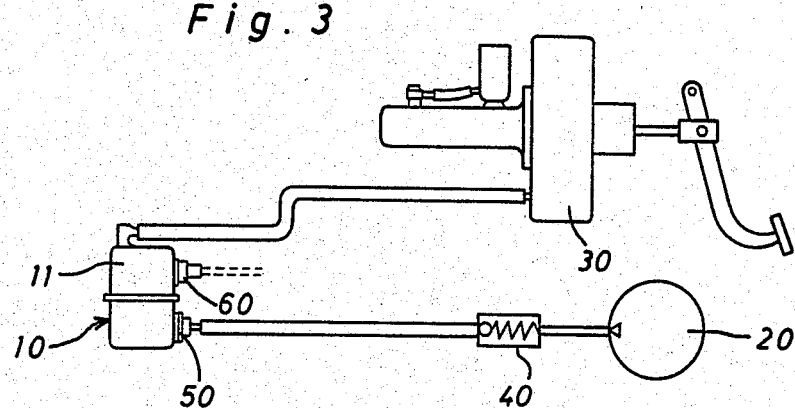
FIG. 3 is a schematic illustration of a braking system for vehicles including a vacuum reservoir assembly in accordance with the present invention.
Figure 4:
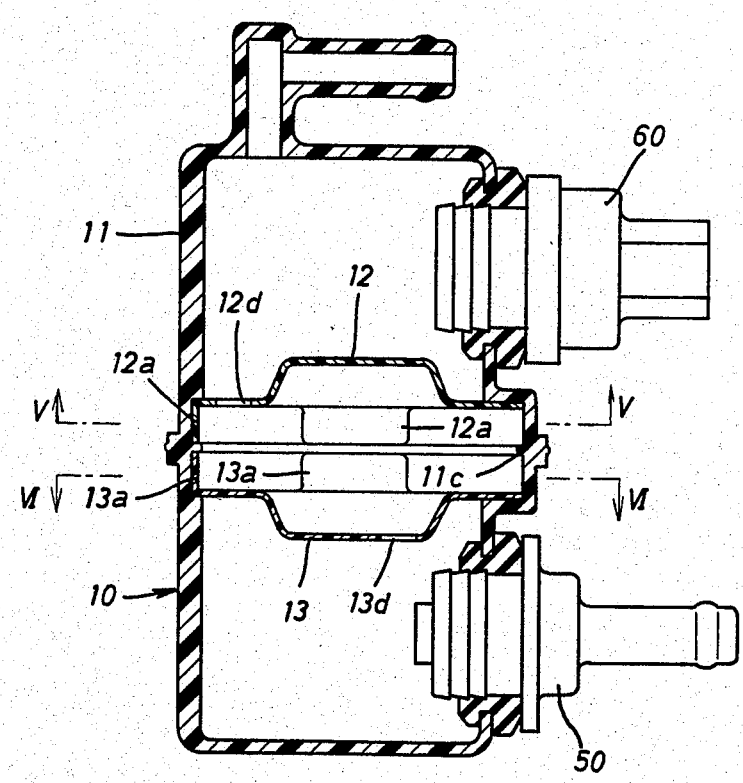
FIG. 4 is an enlarged sectional view of the reservoir assembly shown in FIG. 3.
Figure 7:
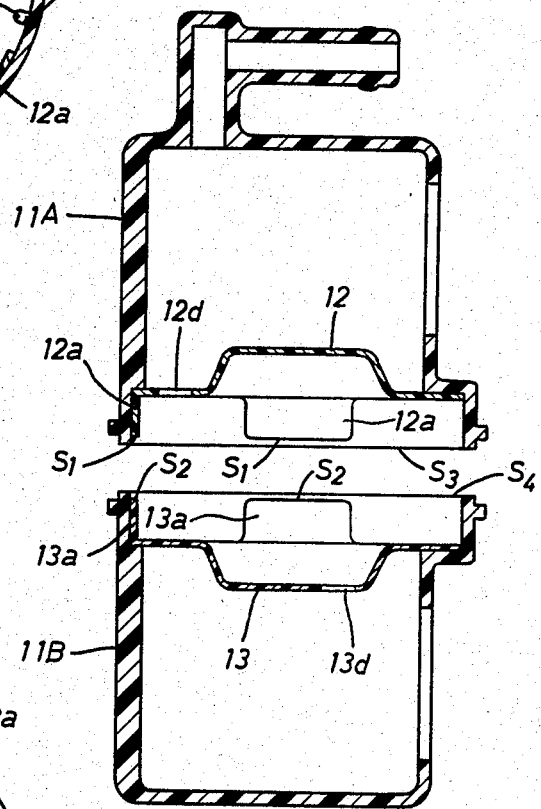
FIG. 7 illustrates a manufacturing process of the reservoir assembly shown in FIG. 4.

Referring now to the drawings, FIG. 3 illustrates a vacuum reservoir assembly 10 according to the present invention which is interposed between a vacuum pump 20 and a vacuum brake booster 30, the former being arranged to be driven by an internal combustion engine (not shown). The vacuum reservoir assembly 10 is connected to the vacuum pump 20 by way of a conduit in which a check valve 40 is disposed to interrupt the flow of lubricating oil from the vacuum pump 20 into the vacuum reservoir assembly 10. The vacuum reservoir assembly 10 is further provided with another check valve 50 and a vacuum warning switch 60. The check valve 50 is provided to interrupt the flow of lubricating oil into the vacuum reservoir assembly from the check valve 40. As is illustrated in FIG. 4, a housing assembly 11 for the vacuum reservoir 10 is provided therein with a pair of upper and lower partition plates 12 and 13 which are arranged to subdivide the interior of reservoir assembly 10 into three chambers. As is illustrated in FIG. 7, the housing assembly 11 comprises a pair of cup-shaped housing members 11A and 11B each made of thermoplastic resin such as 66-nylon contained with glass fiber of 30%. The housing members 11A and 11B are integrally secured to each other at their opening ends by heated air or heat plate welding to complete the reservoir assembly 10.

Figure 5:
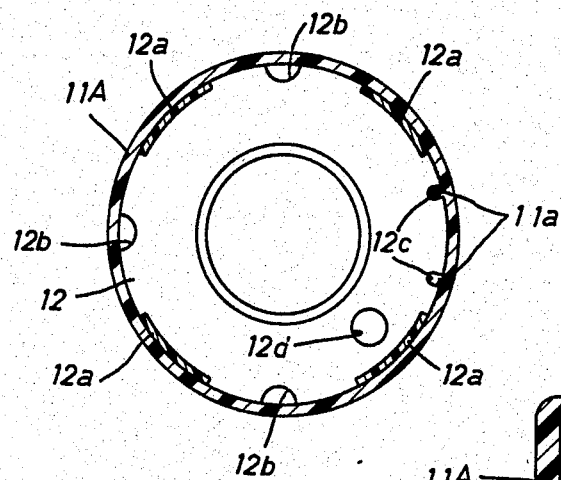
FIG. 5 is a cross-sectional view taken along line V—V in FIG. 4.
Figure 6:
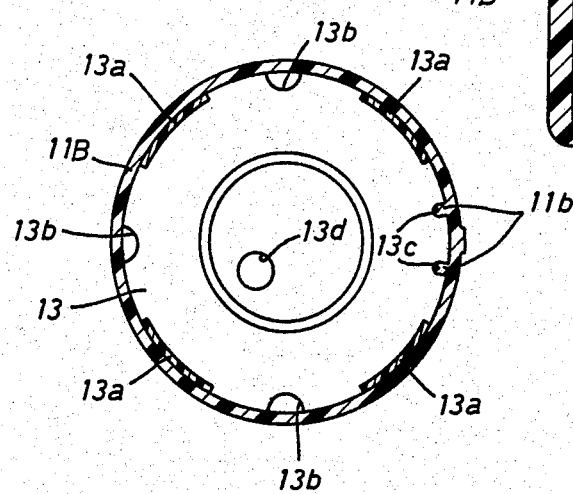
FIG. 6 is a cross-sectional view taken along line VI—VI in FIG. 4.

As is illustrated in FIGS. 4, 5 and 7, the upper partition plate 12 is in the form of a disc made of thermoplastic resin which is integrally formed with four circumferentially equi-spaced lugs 12a, three semi-circular recesses 12b, two spaced radial recesses 12c, and an axial hole 12d. The upper partition plate 12 is arranged in the interior of housing member 11A in such a manner that the radial recesses 12c of plate 12 are fixedly engaged with a pair of spaced radial projections 11a extending inwardly from the peripheral wall of housing member 11A. As is illustrated in FIGS. 4, 6 and 7, the lower partition plate 13 is also in the form of a disc made of thermoplastic resin which is provided with four circumferentially equi-spaced lugs 13a, three semi-circular recesses 13b, two spaced radial recesses 13c, and an axial hole 13d. The lower partition plate 13 is arranged in the interior of housing member 11B in such a manner that the radial recesses 13c of plate 13 are fixedly engaged with a pair of spaced radial projections 11b extending inwardly from the peripheral wall of housing member 11B. The radial recesses 13c are circumferentially spaced in a distance different from the space between the radial recesses 12c of plate 12 to avoid an error in assembling processes of the partition plates 12 and 13 to the respective housing members 11A and 11B.

As is illustrated in FIG. 7, the housing members 11A and 11B are respectively formed at their opening end portions with a stepped inner wall. When coupled respectively with the stepped inner walls of housing members 11A and 11B, the partition plates 12 and 13 are positioned in such a manner that the opening ends $S_1$ and $S_2$ of plates 12 and 13 are respectively located inside the opening ends $S_3$ and $S_4$ of housing members 11A and 11B. With such an arrangement, the welding of housing members 11A and 11B is carried out by heated air or heat plate in a simple manner without any obstruction, and as can be well seen in FIG. 4, the partition plates 12 and 13 are fastened in place by an annular bead 11c which is radially inwardly extruded during the welding process of housing members 11A and 11B.

In the embodiment described above, it will be noted that both the partition plates 12 and 13 can be coupled, respectively in a simple manner, with the stepped inner walls of housing members 11A, 11B and secured in place during the welding process of housing members 11A and 11B at their opening ends. Advantageously, a molding die for the cup-shaped housing members 11A and 11B can be formed in a simple construction owing to provision of the stepped inner walls at the opening end portions of housing members 11A and 11B, and also a molding die for the partition plates 12 and 13 can be formed in a simple construction because the outer peripheries of the partition plates 12 and 13 are formed without any projections or recesses resulting in difficulty of removal from the die. Although in the above embodiment, both the partition plates 12 and 13 are made of thermoplastic resin, they may be made of metal and may be modified in their configuration.

Although a certain specific embodiment of the present invention has been shown and described, it is obvious that the present invention may be adapted to various type of reservoir assemblies. It is to be understood, therefore, that within the scope of the appended claims, the invention may be practiced otherwise than as specifically described herein.

What is claimed is:

1. A reservoir assembly comprising:
    a pair of cup-shaped housing members each made of thermoplastic resin and having an opening end, said housing members being integrally secured by heat welding to each other at their opening ends; and
    a partition plate arranged within said housing members to subdivide the interior of said reservoir assembly into two chambers;
    wherein one of said housing members is formed at the opening end portion thereof with a stepped inner wall which is coupled with the outer periphery of said partition plate in such a manner that said partition plate is positioned inside the opening end of said housing member and fastened in place by an annular bead which is radially inwardly extruded at the opening end of said housing member during the heat welding process.

2. A reservoir assembly as claimed in claim 1, wherein said partition plate is made of thermoplastic resin and is integrally formed at the outer periphery thereof with a plurality of circumferentially spaced lugs which are coupled with the stepped inner wall of said housing member in such a manner that the outer ends of said lugs are positioned inside the opening end of said housing member and fastened in place by said annular bead.

3. A reservoir assembly comprising:
    a pair of cup-shaped housing members each made of thermoplastic resin and having an opening end, said housing members being integrally secured by heat welding to each other at their opening ends; and
    a pair of partition plates arranged within said housing members to subdivide the interior of said reservoir assembly into three chambers;
    wherein said housing members are formed respectively at the opening end portions thereof with a stepped inner wall which is coupled with the outer periphery of said respective partition plates in such a manner that each of said partition plates is positioned inside the opening end of said respective housing members and fastened in place by an annular bead which is radially inwardly extruded at the opening end of said respective housing members during the heat welding process.

4. A reservoire assembly as claimed in claim 3, wherein each of said partition plates is made of thermoplastic resin and is integrally formed with a plurality of circumferentially spaced lugs which are coupled with the stepped inner wall of said respective housing members in such a manner to position the outer ends of said lugs inside the opening end of said respective housing members.

5. A reservoir assembly as claimed in claim 3, wherein one of said partition plates is integrally formed at the outer periphery with a pair of spaced radial recesses which are engaged with a pair of spaced radial projections extending inwardly from the peripheral wall of one of said housing members, and the other partition plate is integrally formed at the outer periphery with a pair of radial recesses which are spaced in a distance different from the space between said first-named recesses and engaged with a pair of spaced radial projections extending inwardly from the peripheral wall of the other housing member.

* * * * *